United States Patent
Devta et al.

(10) Patent No.: US 11,595,299 B2
(45) Date of Patent: Feb. 28, 2023

(54) SYSTEM AND METHOD OF SUPPRESSING INBOUND PAYLOAD TO AN INTEGRATION FLOW OF AN ORCHESTRATION BASED APPLICATION INTEGRATION

(71) Applicant: ORACLE INTERNATIONAL CORPORATION, Redwood Shores, CA (US)

(72) Inventors: Prakash Kumar Devta, Bangalore (IN); Sandeep Deshpande, Bangalore (IN); Srimant Misra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 139 days.

(21) Appl. No.: 16/942,425

(22) Filed: Jul. 29, 2020

(65) Prior Publication Data

US 2022/0038367 A1 Feb. 3, 2022

(51) Int. Cl.
| | | |
|---|---|---|
| H04L 45/00 | (2022.01) | |
| H04L 45/745 | (2022.01) | |
| H04L 47/2441 | (2022.01) | |
| H04L 47/30 | (2022.01) | |
| G06F 8/36 | (2018.01) | |
| G06F 9/54 | (2006.01) | |

(52) U.S. Cl.
CPC .............. *H04L 45/38* (2013.01); *G06F 8/36* (2013.01); *G06F 9/541* (2013.01); *H04L 45/745* (2013.01); *H04L 47/2441* (2013.01); *H04L 47/30* (2013.01)

(58) Field of Classification Search
CPC ......... G06F 8/36; G06F 9/541; H04L 45/745; H04L 47/2441; H04L 37/30
USPC .................................................. 717/116–125
See application file for complete search history.

(56) References Cited

U.S. PATENT DOCUMENTS

| | | | | |
|---|---|---|---|---|
| 7,058,014 B2 * | 6/2006 | Sim ....................... | H04L 47/125 707/E17.032 |
| 7,065,746 B2 * | 6/2006 | Szabo ..................... | G06F 9/541 717/121 |
| 7,165,095 B2 * | 1/2007 | Sim ....................... | H04L 47/125 709/217 |
| 7,667,582 B1 * | 2/2010 | Waldorf ................ | G06T 11/206 340/440 |
| 7,987,272 B2 * | 7/2011 | Kumar ................... | H04L 69/08 709/227 |
| 8,566,697 B2 * | 10/2013 | Meredith ................ | G06F 3/048 715/205 |
| 8,683,443 B2 | 3/2014 | Hatton | |
| 8,799,854 B2 * | 8/2014 | Meliksetian .............. | G06F 8/36 717/107 |

(Continued)

OTHER PUBLICATIONS

Grimm et al, "Flow-based Aggregation of CAN Frames with Compressed Payload", IEEE, pp. 202-207 (Year: 2020).*

(Continued)

*Primary Examiner* — Anil Khatri
(74) *Attorney, Agent, or Firm* — Tucker Ellis LLP (57) ABSTRACT

Described herein are systems and methods for suppressing inbound payload to an integration flow of an orchestration based application integration. The systems and methods described herein can, based upon a scan of an integration, identify and exclude from memory certain portions of one or more payloads that are received at the integration flow.

12 Claims, 8 Drawing Sheets

(56) References Cited

U.S. PATENT DOCUMENTS

| | | | |
|---|---|---|---|
| 8,875,091 B1* | 10/2014 | Rouleau | G06F 11/3668 717/124 |
| 8,930,348 B2 | 1/2015 | Tarachandani et al. | |
| 9,348,488 B1* | 5/2016 | Renema, II | G09B 15/00 |
| 9,436,763 B1* | 9/2016 | Gianos | G06F 16/958 |
| 9,524,275 B2 | 12/2016 | Sampathkumar et al. | |
| 9,990,188 B2* | 6/2018 | Khot | G06F 8/51 |
| 10,089,120 B2* | 10/2018 | Baumecker | G06F 9/451 |
| 10,289,538 B1* | 5/2019 | Dwivedi | G06F 11/0718 |
| 10,592,403 B2* | 3/2020 | Reeve | G06F 18/231 |
| 10,628,237 B2* | 4/2020 | Gravenites | G06Q 10/063 |
| 10,708,135 B1* | 7/2020 | Elliott, IV | G06F 9/5005 |
| 10,713,403 B1* | 7/2020 | Agrawal | G06F 30/30 |
| 10,789,050 B2* | 9/2020 | Kendai | G06F 8/34 |
| 10,970,298 B1* | 4/2021 | Madheswaran | G06F 16/22 |
| 11,074,107 B1* | 7/2021 | Nandakumar | G06F 8/10 |
| 11,381,638 B1* | 7/2022 | Devta | H04L 67/10 |
| 2009/0150412 A1 | 6/2009 | Idicula et al. | |

OTHER PUBLICATIONS

Yang et al, "APKLancet: Tumor Payload Diagnosis and Purification for Android Applications", ACM, pp. 483-494 (Year: 2014).*

Deline et al, "Code Canvas: Zooming towards Better Development Environments", ACM, pp. 207-210 (Year: 2010).*

Pitayachaval et al, "Integration of Business Model Canvas (BMC) and Quality Function Deployment (QFD) to Design Product", IEEE, pp. 76-80 (Year: 2017).*

Fritscher et al, "Visualizing Business Model Evolution with the Business Model Canvas: Concept and Tool", IEEE, pp. 151-158 (Year: 2014).*

Meertens et al, Mapping the Business Model Canvas to ArchiMate, ACM, pp. 1694-1701 (Year: 2012).*

He, "Integration and Orchestration of Heterogeneous Services", IEEE, pp. 467-470 (Year: 2009).*

Gorton et al, "Next Generation Application Integration: Challenges and New Approaches", IEEE, pp. 1-6 (Year: 2003).*

Gortmaker et al, "The Advantages of Web Service Orchestration in Perspective", ACM, pp. 506-515 (Year: 2004).*

Tan, "Answering XPath Queries in Virtual XML Data Integration System", IEEE, pp. 685-688 (Year: 2008).*

Mastykarz, Waldek; "Removing unwanted fields from imported List Instances using XSLT", published Sep. 13, 2011, retrieved from https://blog.mastykarz.nl/removing-unwanted-fields-imported-list-instances-xslt/, 9 pages.

OxygenXml, "[xsl] pruning nodes not in xpath list", retrieved from https://www.oxygenxml.com/archives/xsl-list/200102/msg01789.html on Dec. 16, 2020, 5 pages.

Peintner, et al., "LazyDOM: Transparent Partial DOM Loading and Unloading for Memory Restricted Environments", Proceedings of the 7th International Conference on Web Information Systems and Technologies, May 6-9, 2011, pp. 98-105, 16 pages.

Stack Overflow, "Script to determine unused elements between XSLT and XML data source", published Feb. 7, 2014, retrieved from https://stackoverflow.com/questions/21637292/script-to-determine-unused-elements-between-xslt-and-xml-data-source/21639264#21639264, 2 pages.

Stack Overflow, "skip over nodes with XSLT", published Oct. 12, 2010, retrieved from https://stackoverflow.com/questions/3914233/skip-over-nodes-with-xslt, 3 pages.

* cited by examiner

SYSTEM AND METHOD OF SUPPRESSING INBOUND PAYLOAD TO AN INTEGRATION FLOW OF AN ORCHESTRATION BASED APPLICATION INTEGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related integration cloud services, and in particular, suppressing inbound payload to an integration flow of an orchestration based application integration.

BACKGROUND

Integration cloud services (ICS) (e.g., ORACLE Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

In accordance with an embodiment, described herein are systems and methods for suppressing inbound payload to an integration flow of an orchestration based application integration. A method for suppressing inbound payload to an integration flow of an orchestration based application integration, can provide a computer including one or more microprocessors. The method can provide an integration platform running on the computer. The method can provide an integration flow at the integration platform. A scan of the integration flow can generate a list of elements (e.g., XPahts) to include or exclude, which can be added as a property in adapter configuration (e.g., JCA). This scan of an integration flow can be performed for each adapter endpoint in the flow to see which elements from this endpoint's inbound payload are used in the integration flow. Based on the outcome of the scan, a property is added to the endpoint's configuration (JCA file). This will be used by translator at runtime. This list is specific to an adapter endpoint in the flow. The file can comprise a list of one of included payload elements or excluded payload elements. Upon upload of a payload being received at the integration flow, portions of the payload file are excluded from memory associated with the integration platform based upon the file.

In accordance with an embodiment, described herein are systems and methods for suppressing inbound payload to an integration flow of an orchestration based application integration. The systems and methods described herein can, based upon a scan of an integration, identify and exclude from memory certain portions of one or more payloads that are received at the integration flow

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a service, for example, ORACLE Integration Cloud Service (ICS), can provide a cloud-based platform for building and deploying integrations flows that connect applications residing in the cloud or on-premises.

Integration Cloud Service

Figure 1:
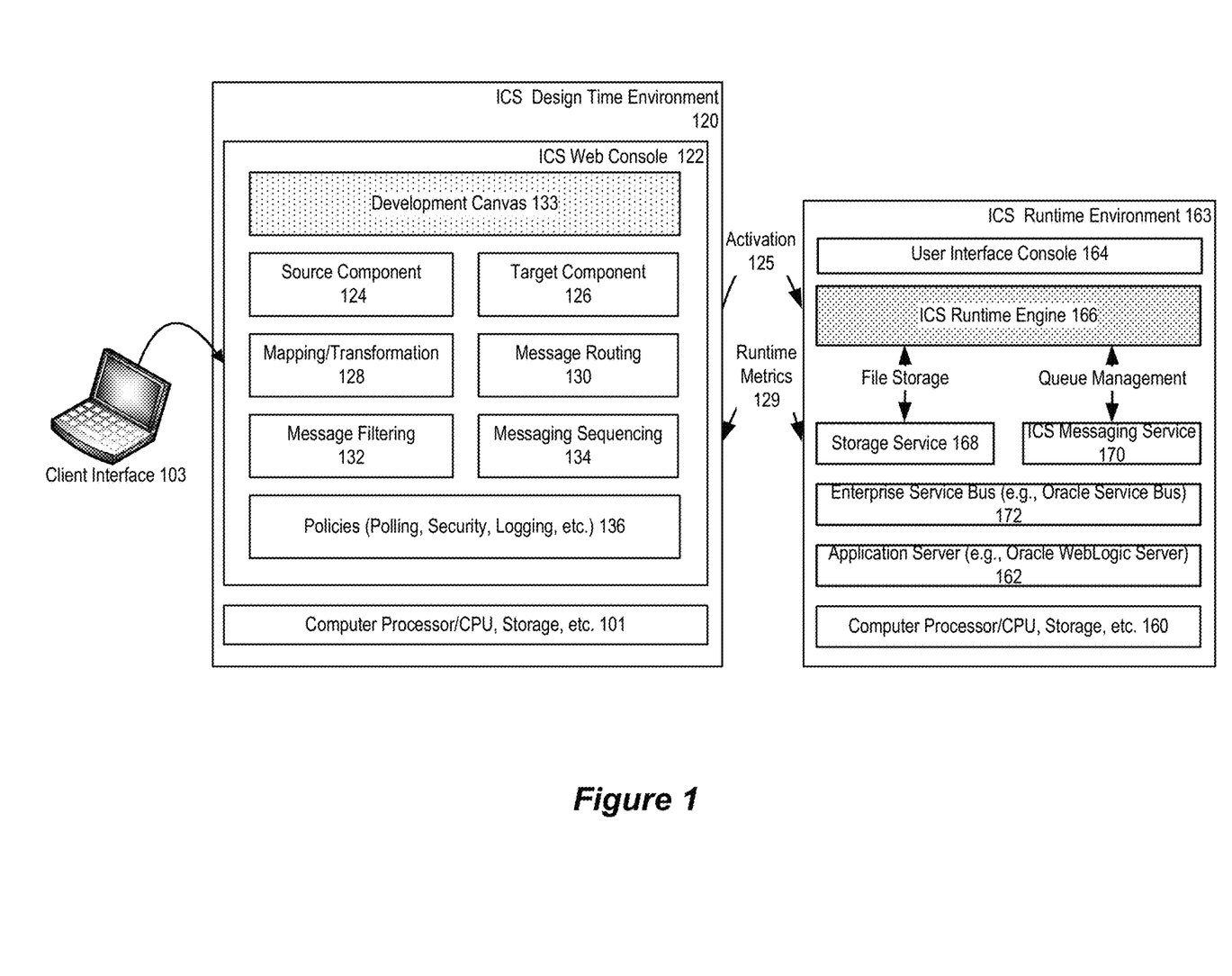
FIG. 1 illustrates an ICS platform for designing and executing an ICS integration flow, in according with an embodiment.

FIG. 1 illustrates an ICS platform for designing and executing an ICS integration flow, in according with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
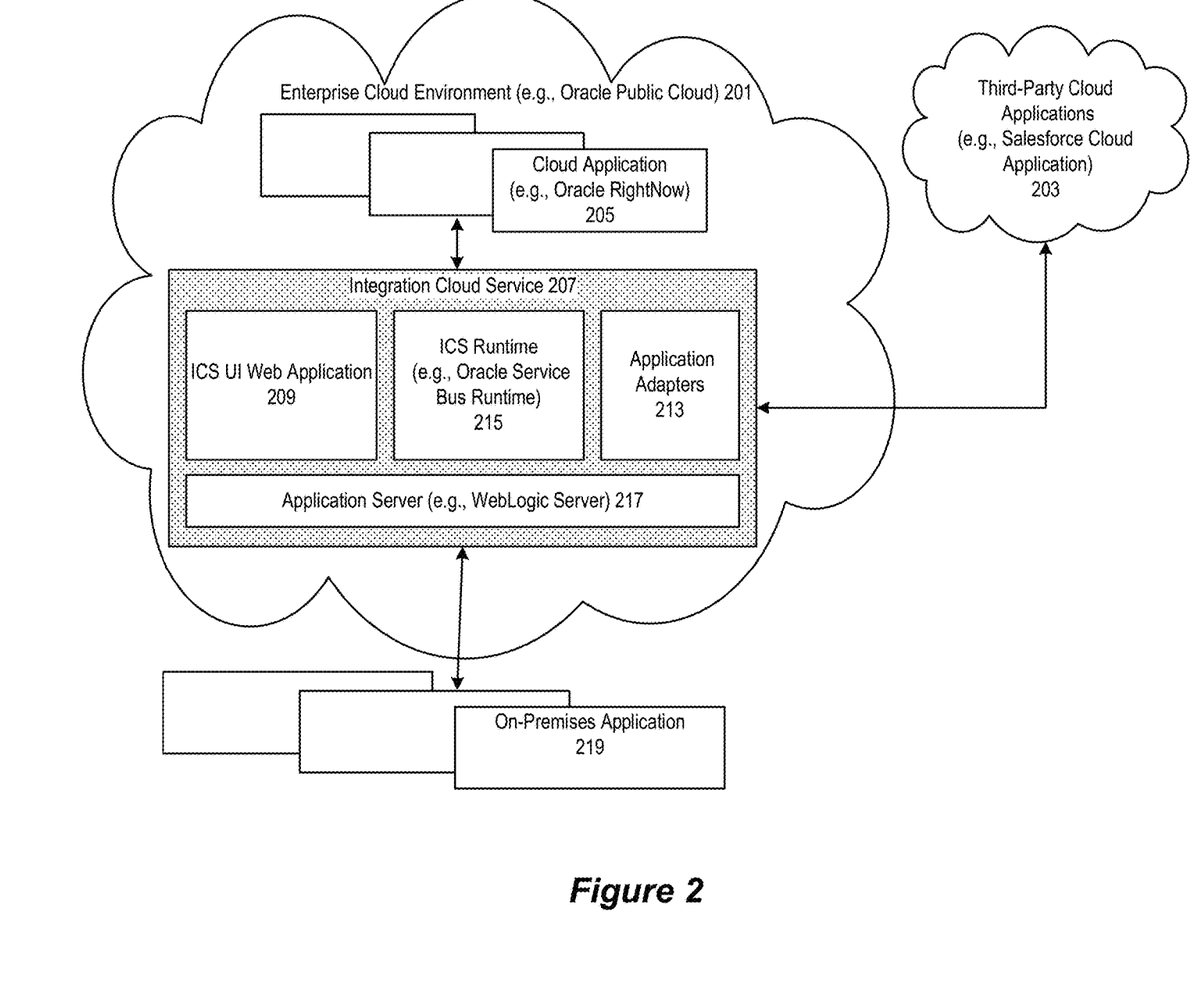
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, ORACLE Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
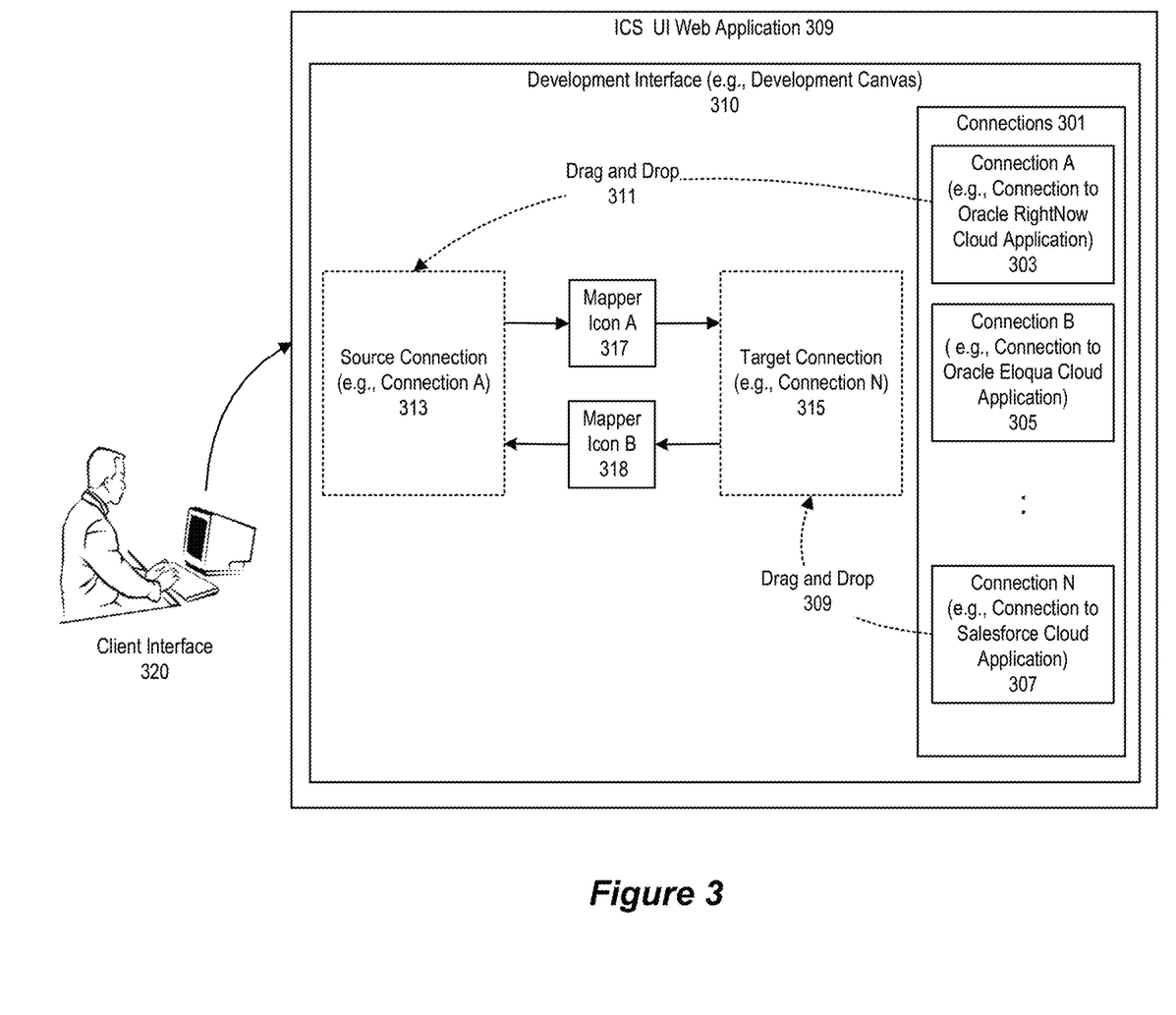
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Suppressing Inbound Payload to Integration Flow

In accordance with an embodiment, an integration of applications consists of multiple applications working together in an orchestration. Generally, an orchestration platform (also known as the integration platform) provides ways to interact with these applications with the help of client applications. These client applications are called connectors or adapters.

In accordance with an embodiment, during runtime of the integration flow instance, a message (known as, payload) can traverse through the flow and be transformed for specific application endpoints. Generally, the internal format of the message going through transformations is XML (Extensible Markup Language). XSLT (Extensible Stylesheet Language Transformations) is a standard way of transforming an XML payload (source) into another XML payload (target). In the integration flow, the integration designer can add these transformers (which can be referred to as a "mapper" or "mappers") at various points in the orchestration logic.

In accordance with an embodiment, for example, for each instance of a mapper, an XSLT document is generated. This document will have the XPath (XML Path Language) of the source elements from which values need to be picked and assigned to target elements.

In accordance with an embodiment, the inbound payload to an integration (request to trigger or response from an application endpoint) is "read only". The designed integration picks elements (based on XSLT mapping)s from this payload and works on them.

In accordance with an embodiment, the inbound payload to an integration can be in various formats (e.g., JSON, XML, Multipart, . . . etc.) This payload gets translated to XML based on a schema expected by the integration. This translated XML payload goes through transformations via mapper (XSLT).

In accordance with an embodiment, the evaluation of XPath on the XML payload, requires a Document Object Model (DOM). A DOM can be a platform- and language-neutral interface that allows programs and scripts to dynamically access and update the content, structure and style of documents. The Document Object Model provides a standard set of objects for representing HTML and XML documents, a standard model of how these objects can be combined, and a standard interface for accessing and manipulating them. A DOM can be supported as an interface to data structures and APIs, and content authors can write to the standard DOM interfaces rather than product-specific APIs, thus increasing interoperability.

In accordance with an embodiment, the DOM in an integration flow can comprise a data structure which forms a tree in memory. The nodes in the tree represent elements of XML. The leaf nodes have text in them.

In accordance with an embodiment, in the context of an integration flow, the XPath evaluation results in selection of some texts (based on mapping) from this DOM. Other nodes are omitted and data within them doesn't matter in integration flow logic.

In accordance with an embodiment, a problem with the DOM, however, is that the nodes not used in any given integration are still maintained in memory. These nodes take memory from the application's heap and this can be avoided.

In accordance with an embodiment, systems and methods can, in order to minimize the size of the DOM in memory and improve performance, suppress data (or text) from inbound payload, which will not be used by the integration flow.

In accordance with an embodiment, during the design of an integration flow (i.e., "design time"), a scan of integration project model and involved XSLTs can be performed to determine out the XML nodes (XPaths) which are used from inbound payloads (e.g., payloads from external applications to which the connectors/adapters link). For example, during design time, it can be determined that out of 10 elements in an XML payload, the integration developer may have mapped only 4 of those 10 elements.

In accordance with an embodiment, once the systems and methods have a list of all the elements from various inbound payloads (request to trigger, responses from invokes), an inverse XPath for each XML payload can be generated. This can comprise the list of nodes from a XML payload which are not used in the integration flow. For example, in the earlier example, only 4 elements out of 10 elements were selected for the integration, so the inverse selection will give us the list of remaining 6 element's XPath which are not used in the flow.

The, in accordance with an embodiment, for each inbound payload, the systems and methods can generate a list of XPath elements which will be suppressed during the integration flow.

In accordance with an embodiment, depending upon how many elements are mapped from an inbound payload, the integration design time can decide whether to work with list of XPaths of included elements or list of XPath of excluded elements.

In accordance with an embodiment, from a large inbound payload schema, if only few elements are mapped, the systems and methods can run efficiently by working with just the XPaths of included elements. If, instead, a major portion of the inbound payload is mapped, then it becomes more efficient to work with just the XPaths of excluded elements.

In accordance with an embodiment, an integration artifact can maintain this information as a list (the list of included XPath elements or the list of excluded XPath elements, whichever is more efficient) in a property file or JCA file.

In accordance with an embodiment, the determination of the included/excluded XPath elements needs to only happen once during the design time of the integration flow.

In accordance with an embodiment, at runtime, based upon the list of XPath elements (included or excluded) stored in the property file or the JCA file, the integration can determine which elements of a payload to carry throughout the integration flow, and which can be ignored, thus freeing up memory space.

In accordance with an embodiment, the integration runtime can pass this list of XPaths (elements which are needed/not needed by the flow) to the translator as a "translation context". Depending upon additional configuration in the "translation context", a translator can decide to either suppress the text of unwanted nodes in the translated XML or it can remove unwanted nodes from the translated XML.

In accordance with an embodiment, generally, the translator builds an XML document object and adds elements to it from the inbound payload.

In accordance with an embodiment, in a first option where a list of excluded XPaths is provided: At the time of adding an element, a translator can look up a cache to check if the XPath of the element being added matches with any XPath of the element which needs to be suppressed. If it matches, then the element's text is either replaced with a predefined dummy value depending upon the type (For example an element with text "This is a long description of this element . . . " can be replaced with just " ") or it can be removed from the XML document object. If XPath of the element being added doesn't match with any XPath, then no suppression is performed for that element.

In accordance with an embodiment, in a second option where a list of included XPaths is provided: At the time of adding an element, translator can look up a cache to check if the XPath of the element being added matches with any XPath of the element which need to be included. If it matches, then the element is translated and included without suppression, otherwise, the element's text is either replaced with a predefined dummy value depending upon the type (For example an element with text "This is a long description of this element . . . " can be replaced with just " ") or it can be removed from the XML document object.

In accordance with an embodiment, in this way, the translated XML will be of a smaller size and the DOM will take less memory. The information needed by the integration is not altered or suppressed, so the runtime logic will not be affected.

In accordance with an embodiment, in a situation where a designed integration is altered, or when mapping of elements is changed, the list of included/excluded XPaths can likewise be updated in the integration artifact.

Figure 4:
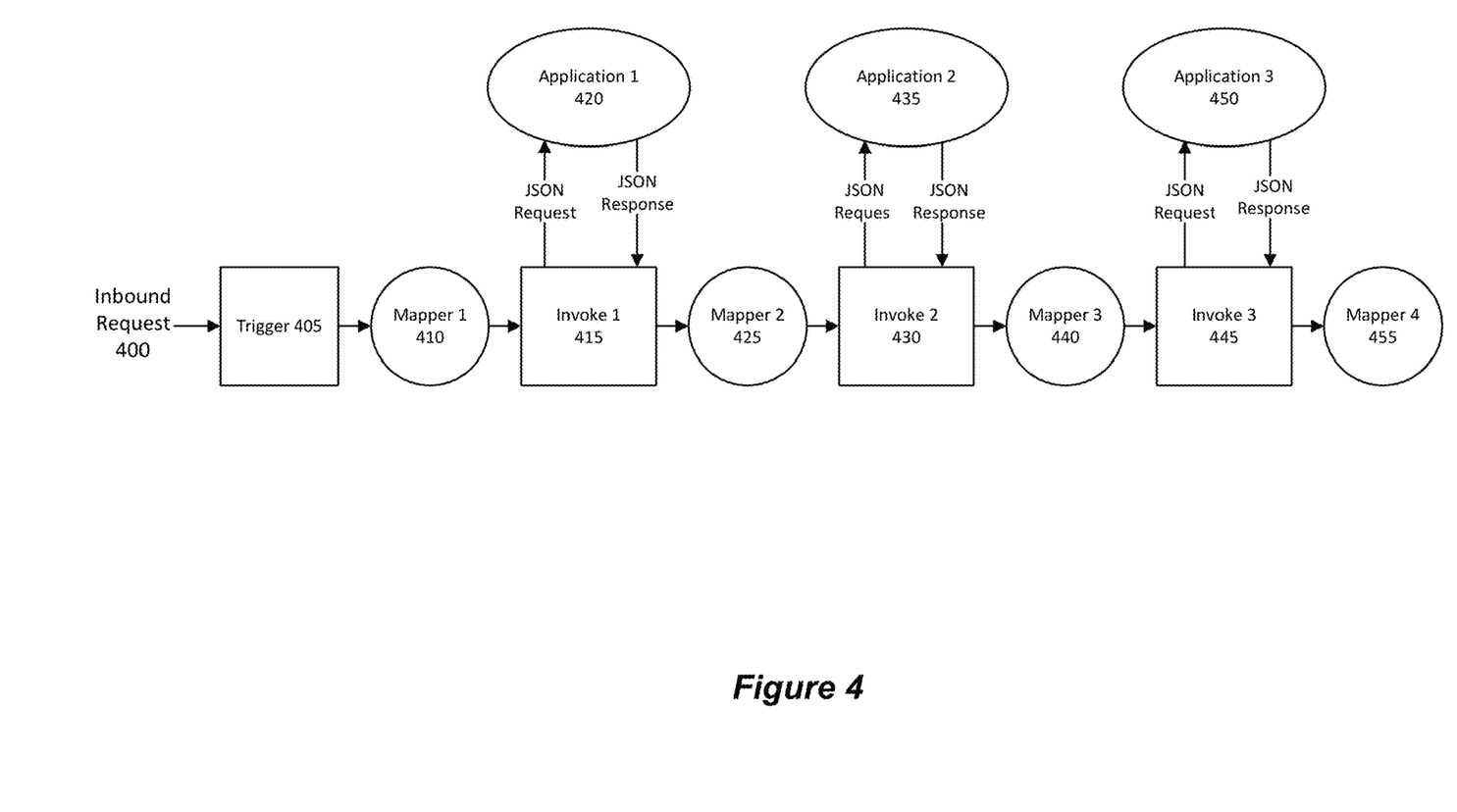
FIG. 4 shows an integration flow for suppressing inbound payload of an orchestration based application integration, in accordance with an embodiment.

FIG. 4 shows an integration flow for suppressing inbound payload of an orchestration based application integration, in accordance with an embodiment.

In accordance with an embodiment, the description of FIG. 4 can is described in the context of the below illustrated example.

In accordance with an embodiment, an inbound request 400, such as a JSON Request (far left side of the integration) can comprise a format. The format, for the sake of the example described, has the following format:

```
{
"name":"John Doe"
"age":"35"
"address":"Long String"
}
```

In accordance with an embodiment, such an above string can be translated into XML at runtime. After translation to XML, the request becomes:

```
<execute>
<request-wrapper>
<name> John Doe </name>
<age> 35 </age>
<address> Long String </address>
</request-wrapper>
</execute>
```

In accordance with an embodiment, a scan during the design time of the integration flow shown in FIG. 4 can determine that the <address> element of the inbound request is not used in the integration flow at all. Thus, the trigger's 405 property file/JCA file can comprise an operation property like below:

"inbound suppress XPath list"="XPath of address"

In accordance with an embodiment, mapper 1 410 can then map the remaining elements (e.g., <name> and <age>) to continue on within the integration, while the <address> element can be suppressed.

In accordance with an embodiment, suppose that the XML response from Application 2 435 to Invoke 2 430 is as follows:

```
<response>
<docID>1234</docID>
<docAuthor>Mark</docAuthor>
<docCreationDate>12.01.2019</docCreationDate>
<docSummary>long text........</docSummary>
</response>
```

In accordance with an embodiment, a scan during the design time of the integration flow shown in FIG. 4 can determine that the <docSummary> and <docCreationDate> elements are not used from this inbound payload in the entirety of the integration flow. Thus, a property file of invoke 2 430 can comprise a property/JPA file that comprises an operation property like below:

"inbound suppress XPath list"="XPath of docSummary, XPath of docCreationDate"

In accordance with an embodiment, then, the mapper 3 440 can then map the remaining elements (e.g., <docl D> and <docAuthor>) to continue on within the integration, while the <docSummary> and <docCreationDate> elements can be suppressed In accordance with an embodiment, each other payload that is incoming to the integration flow, e.g., from Application 1 420 and Application 3 450, can additionally comprise an exclusion/inclusion list according to the results of a scan during the design time of the integration flow of FIG. 4.

In accordance with an embodiment, during runtime, the translator which translates inbound message (may be in JSON/XML) to integration format (XML) can use the property "inbound suppress XPath list" to suppress or remove unwanted nodes.

In accordance with an embodiment, similarly, for a large inbound payload schema where only few elements are mapped, integration can decide to add a property "inbound include XPath list" and at runtime, this property will be used by translator to translate included elements properly and suppress/remove other elements.

Figure 5:
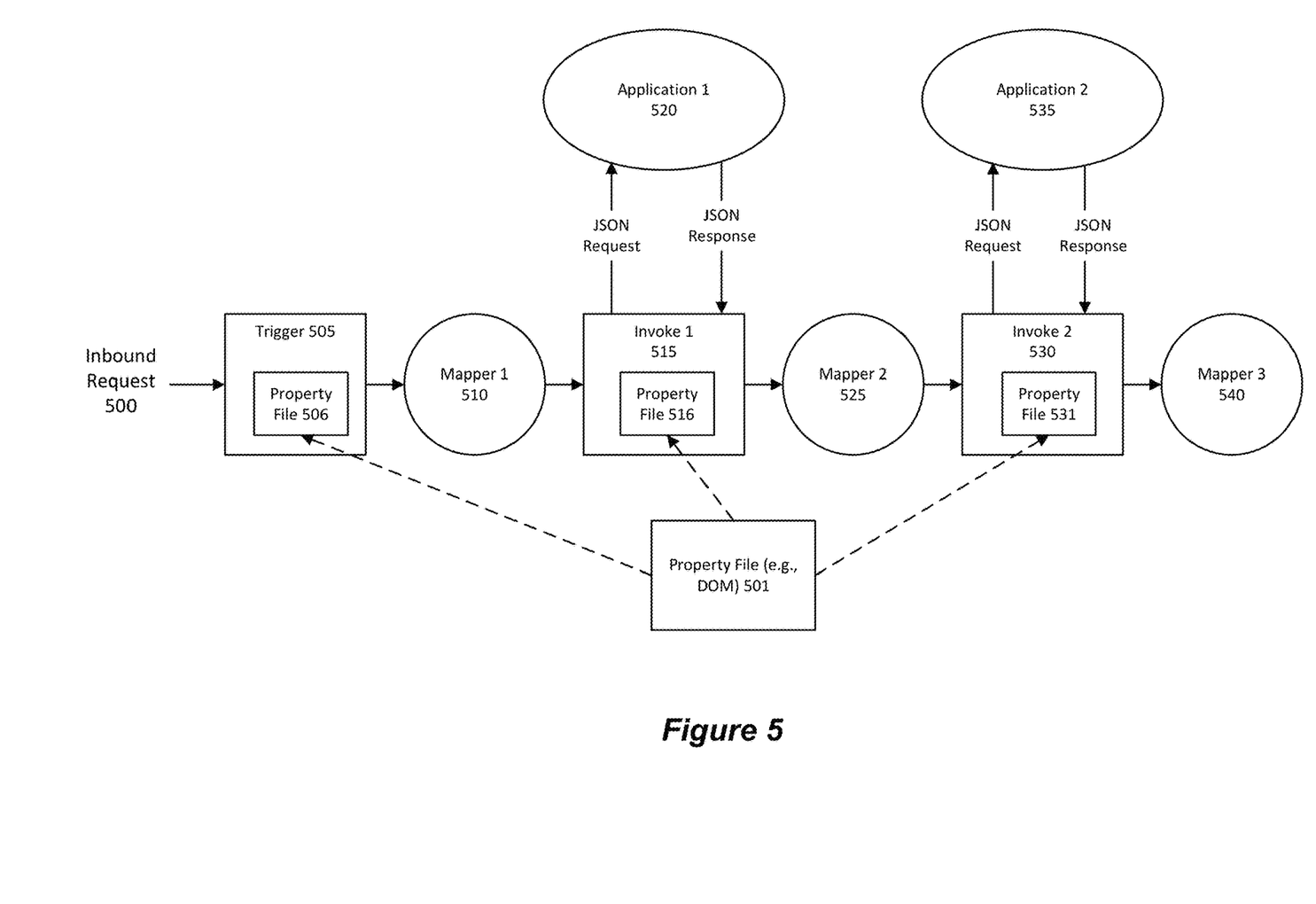
FIG. 5 shows an integration flow for suppressing inbound payload of an orchestration based application integration, in accordance with an embodiment.

FIG. 5 shows an integration flow for suppressing inbound payload of an orchestration based application integration, in accordance with an embodiment.

In accordance with an embodiment, FIG. 5 shows an integration flow that can be triggered via an inbound request 500. The integration flow can comprise a trigger 505, a mapper 1 510, an invoke 1 515 linked with external application 1 520, a mapper 2 525, an invoke 2 530 linked with external application 2 535, and a mapper 3 540.

In accordance with an embodiment, the integration flow can be scanned (e.g., after the integration flow design has been completed) to determine a listing of elements that are used within the integration flow, as well as a listing of all elements that are inputted into the integration flow (e.g., from the trigger, and from the JSON responses from Applications 1 and 2).

In accordance with an embodiment, after a scan, XPaths of list of elements to include/exclude is added to already generated property file/JCA for adapter endpoints. A property file 501 can be constructed (e.g., a DOM or a JCA file). This property file can comprise either a listing of all included elements within the integration flow, or a listing of all elements not used within the integration flow (determined by subtracting the listing of all used elements from the listing of all elements inputted into the integration flow).

In accordance with an embodiment, upon the property file being constructed, it can be published/copied to elements within the integration flow, such as the trigger, as well as the invoke operations. The property file can be used reduce the size of the data carried throughout the integration flow by, e.g., writing dummy text to those elements that are not used within the integration flow. That is, for example, instead of carrying an unused element of the inbound request throughout the integration flow (where the element could comprise a large amount of text or other data), that element of the inbound request can be replaced with dummy text, which can represent a smaller amount of memory devoted to portions of the payload that must be carried throughout the integration. If a property file was generated with complete scan, then adapter endpoint (invoke/trigger) specific XPaths need to be added from this property file to the JCA of trigger/invoke as an operation property.

Figure 6:
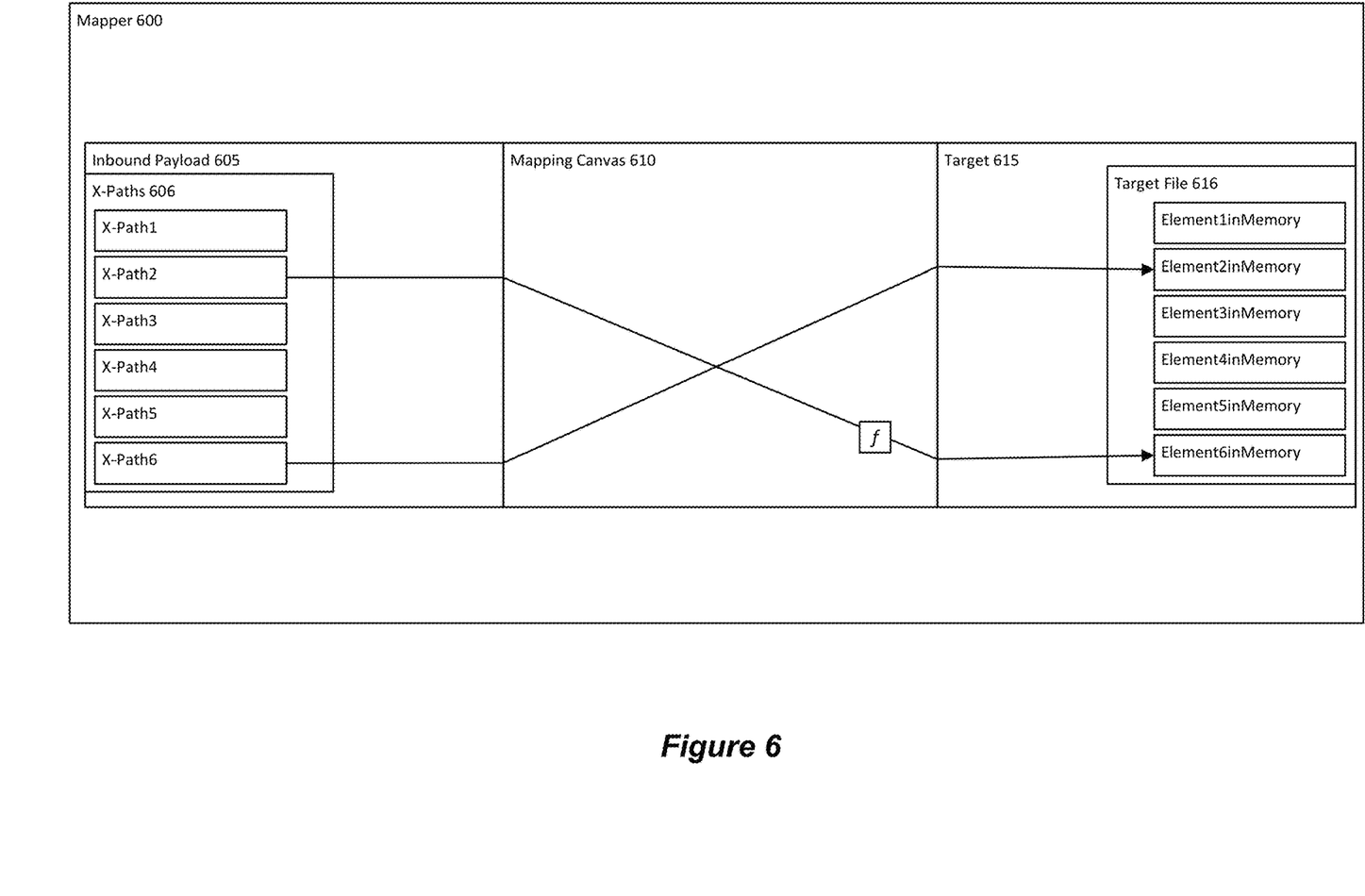
FIG. 6 shows an exemplary mapper which can utilize, e.g., a JCA file, to exclude certain elements of an inbound payload, in accordance with an embodiment.

FIG. 6 shows an exemplary mapper which can utilize, e.g., a JCA file, to exclude certain elements of an inbound payload, in accordance with an embodiment.

In accordance with an embodiment, as shown in FIG. 6, the various XPaths 606 of an inbound payload 605 are shown, a mapping (mapping canvas 610) is shown in the middle, and the resultant file 616 (target 615) to be used in an integration flow is shown on the right, with the elements therein.

In accordance with an embodiment, the mapping that takes place in the middle can be based upon a scan of a related integration flow during runtime that results in an include XPath list from the inbound payload (or an exclude list). Those portions of the inbound payload not mapped via a mapper are then excluded from the memory of the integration flow, thus freeing up space and improving performance.

In accordance with an embodiment, as shown, only two elements, X-Path2 and X-Path6 of the X-Paths 606 of inbound payload 605 are mapped are being shown as being mapped to the target file via the mapping canvas. This is because the mapping canvas, based upon a design time scan of a corresponding integration flow, resulted in a file (e.g., JCA file) that excludes various the other XPaths of the input file or payload (JSON/XML etc).

In accordance with an embodiment, as shown, the mapping canvas of mapper 500 can not only apply direct mapping of X-Path elements to a target file, such as that shown of X-Path6 being mapped to Element2inMemory, but the mapping canvas 610 can also apply functions to X-Paths of an inbound payload. This is shown in the mapping of X-Path2 to Element6inMemory where a function is applied to the X-Path during the mapping to the target element.

Figure 7:
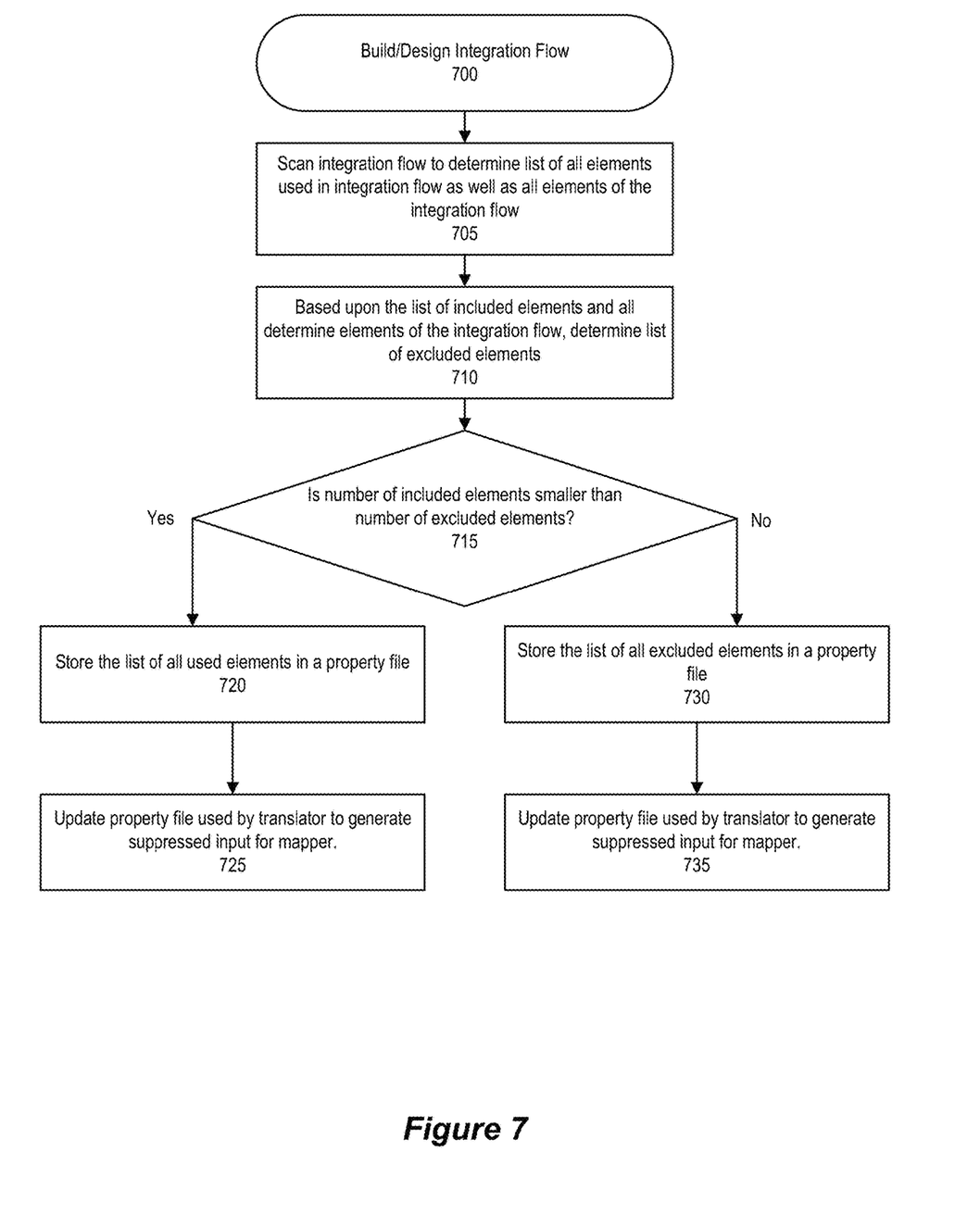
FIG. 7 is a flowchart of an exemplary method for building a property file to be used within an integration flow for suppressing inbound payload of an orchestration based application integration, in accordance with an embodiment.

FIG. 7 is a flowchart of an exemplary method for building a property file to be used within an integration flow for suppressing inbound payload of an orchestration based application integration, in accordance with an embodiment.

In accordance with an embodiment, at step 700, an integration flow can be designed or built according to instructions received.

In accordance with an embodiment, at step 705, the completed integration flow can be scanned to determine 1) a list of all elements used within the integration flow (e.g., a listing of one or more XPaths), and 2) a list of all elements inputted into the integration flow (e.g., a listing of one or more XPaths that are inputted to the integration flow from, e.g., triggers or responses from external applications).

In accordance with an embodiment, at step 710, based upon the two lists determined from step 705, a listing of elements to be excluded from the integration flow can be determined (e.g., by subtracting the list of all elements used in the integration flow from the list of all elements inputted into the integration flow).

In accordance with an embodiment, at step 715, the size of the list of included elements can be compared against the size of the list of excluded elements. In order to minimize the size of the property file, the systems and methods can select the smaller of the two (although this can be defaulted to select one or the other).

In accordance with an embodiment, in order to minimize the size of the property (or JCA) file, if the size of the list of included elements is smaller in memory, then the XPaths of each of the included/used elements can be stored in a property file at step 720.

In accordance with an embodiment, at step 725, the property file (or JCA) is used by adapter. A mapper can obtain gets an XML at runtime. At runtime this property file (JCA) can be used for translating an inbound payload to XML, and during translation unwanted elements from inbound payload will be suppressed by a translator.

In accordance with an embodiment, at step 730, in order to minimize the size of the property (or JCA) file, if the size of the list of excluded elements is smaller in memory, then the XPath of each the excluded/not used elements can be stored in a property file at step 720.

In accordance with an embodiment, at step 735, the property file (or JCA) is used by adapter. A mapper can obtain gets an XML at runtime. At runtime this property file (JCA) can be used for translating an inbound payload to XML, and during translation unwanted elements from inbound payload will be suppressed by a translator.

Figure 8:
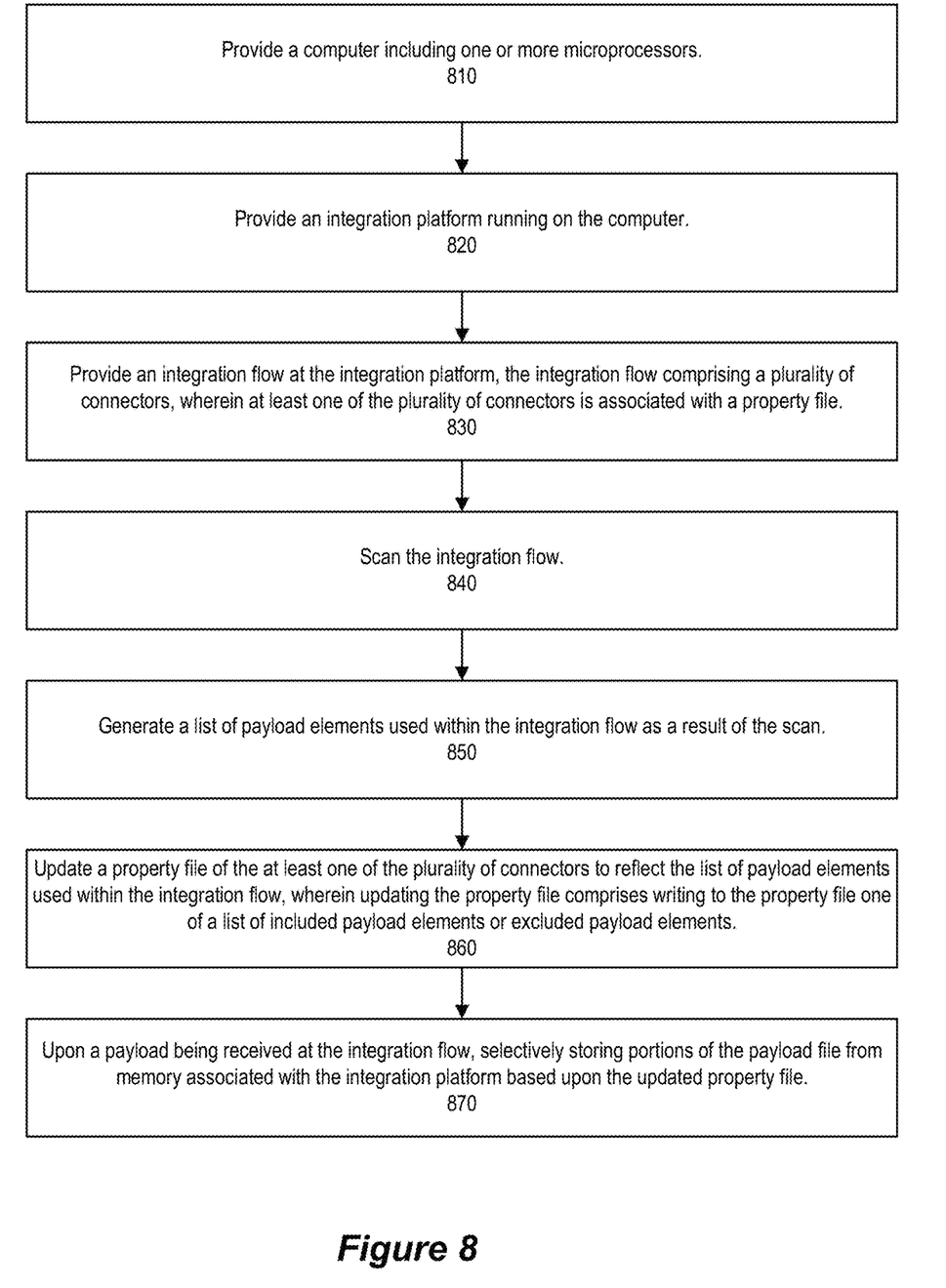
FIG. 8 is a flowchart of a method for suppressing inbound payload to an integration flow of an orchestration based application integration, in accordance with an embodiment.

FIG. 8 is a flowchart of a method for suppressing inbound payload to an integration flow of an orchestration based application integration, in accordance with an embodiment.

In accordance with an embodiment, at step 810, the method can provide a computer including one or more microprocessors.

In accordance with an embodiment, at step 820, the method can provide an integration platform running on the computer.

In accordance with an embodiment, at step 830, the method can provide an integration flow at the integration platform, the integration flow comprising a plurality of connectors, wherein at least one of the plurality of connectors is associated with a property file.

In accordance with an embodiment, at step 840, the method can scan the integration flow.

In accordance with an embodiment, at step 850, the method can generate a list of payload elements used within the integration flow as a result of the scan.

In accordance with an embodiment, at step 860, the method can update a property file of the at least one of the plurality of connectors to reflect the list of payload elements used within the integration flow, wherein updating the property file comprises writing to the property file one of a list of included payload elements or excluded payload elements.

In accordance with an embodiment, at step 870, upon a payload being received at the integration flow, the method can selectively store portions of the payload file in memory associated with the integration platform based upon the updated property file.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for suppressing inbound payload to an integration flow of an orchestration based application integration, comprising:
   a computer including one or more microprocessors;
   an integration platform running on the computer; and
   a development canvas at the integration platform, wherein the development canvas is utilized, based upon received instructions, to design an integration flow at the integration platform, the integration flow comprising a plurality of connectors in an ordered arrangement, the plurality of connectors being connected within the development canvas with a plurality of mappers, wherein at least one of the plurality of connectors is associated with a property file, wherein each of the plurality of connectors provides a connection to an application, of a plurality of applications, external to the integration flow;
   wherein during the design of the integration flow, the integration flow is scanned;
   wherein a list of payload elements used within the integration flow is generated as a result of the scan;
   wherein a property file of the at least one of the plurality of connectors is updated to reflect the list of payload elements used within the integration flow;
   wherein updating the property file comprises writing to the property file one of a list of included payload elements or excluded payload elements;
   wherein upon a payload being received at the integration flow, selected portions of the payload are stored in memory associated with the integration platform based upon the updated property file;
   wherein the payload is received from an external application of the plurality of external applications;
   wherein the scan of the integration flow determines a plurality of elements of the payload received in the integration flow from a call to the external application of the plurality of external applications;
   wherein a set of the plurality of elements of the payload are determined not to be used within the integration flow;
   wherein the property file comprises a list of excluded payload elements;
   wherein the list of excluded payload elements comprises the set of the plurality of elements of the payload from the external application; and
   wherein each of the set of the plurality of elements of the payload from the external application are overwritten prior to the payload being used in the integration flow.

2. The system of claim 1, wherein the payload comprises an Extensible Markup Language (XML) payload.

3. The system of claim 2, wherein XML Path Language (XPath) elements in the XML payload are evaluated using a document object model.

4. The system of claim 3, wherein the list of excluded payload elements comprises a list of excluded XPath elements.

5. A method for suppressing inbound payload to an integration flow of an orchestration based application integration, comprising:
   providing a computer including one or more microprocessors;
   providing an integration platform running on the computer;
   providing a development canvas at the integration platform, wherein the development canvas is utilized, based upon received instructions, to design an integration flow at the integration platform, the integration flow comprising a plurality of connectors in an ordered arrangement, the plurality of connectors being connected within the development canvas with a plurality of mappers, wherein at least one of the plurality of connectors is associated with a property file, wherein each of the plurality of connectors provides a connection to an application, of a plurality of applications, external to the integration flow;
   during the design of the integration flow, scanning the integration flow;
   generating a list of payload elements used within the integration flow as a result of the scan;
   updating a property file of the at least one of the plurality of connectors to reflect the list of payload elements used within the integration flow, wherein updating the property file comprises writing to the property file one of a list of included payload elements or excluded payload elements; and
   upon a payload being received at the integration flow, selectively storing portions of the payload in memory associated with the integration platform based upon the updated property file;
   wherein the payload is received from an external application of the plurality of external applications;
   wherein the scan of the integration flow determines a plurality of elements of a payload received in the integration flow from a call to the external application of the plurality of external applications;
   wherein a set of the plurality of elements of a payload are determined not to be used within the integration flow;
   wherein the property file comprises a list of excluded payload elements;
   wherein the list of excluded payload elements comprises the set of the plurality of elements of the payload from the external application; and
   wherein each of the set of the plurality of elements of the payload from the external application are overwritten prior to the payload being used in the integration flow.

6. The method of claim 5, wherein the payload comprises an Extensible Markup Language (XML) payload.

7. The method of claim 6, wherein XML Path Language (XPath) elements in the XML payload are evaluated using a document object model.

8. The method of claim 7, wherein the list of excluded payload elements comprises a list of excluded XPath elements.

9. A non-transitory computer readable storage medium, having instructions thereon for suppressing inbound payload to an integration flow of an orchestration based application integration, which when read an executed cause a computer to perform steps comprising:
   providing a computer including one or more microprocessors;
   providing an integration platform running on the computer;
   providing a development canvas at the integration platform, wherein the development canvas is utilized, based upon received instructions, to design an integration flow at the integration platform, the integration flow comprising a plurality of connectors in an ordered arrangement, the plurality of connectors being connected within the development canvas with a plurality of mappers, wherein at least one of the plurality of connectors is associated with a property file, wherein each of the plurality of connectors provides a connection to an application, of a plurality of applications, external to the integration flow;

during the design of the integration flow, scanning the integration flow;

generating a list of payload elements used within the integration flow as a result of the scan;

updating a property file of the at least one of the plurality of connectors to reflect the list of payload elements used within the integration flow, wherein updating the property file comprises writing to the property file one of a list of included payload elements or excluded payload elements; and upon a payload being received at the integration flow, selectively storing portions of the payload in memory associated with the integration platform based upon the updated property file;

wherein the payload is received from an external application of the plurality of external applications;

wherein the scan of the integration flow determines a plurality of elements of a payload received in the integration flow from a call to the external application of the plurality of external applications;

wherein a set of the plurality of elements of a payload are determined not to be used within the integration flow;

wherein the property file comprises a list of excluded payload elements;

wherein the list of excluded payload elements comprises the set of the plurality of elements of the payload from the external application; and wherein each of the set of the plurality of elements of the payload from the external application are overwritten prior to the payload being used in the integration flow.

10. The non-transitory computer readable storage medium of claim 9, wherein the payload comprises an Extensible Markup Language (XML) payload.

11. The non-transitory computer readable storage medium of claim 10, wherein XML Path Language (XPath) elements in the XML payload are evaluated using a document object model.

12. The non-transitory computer readable storage medium of claim 11, wherein the list of excluded payload elements comprises a list of excluded XPath elements.

* * * * *

UNITED STATES PATENT AND TRADEMARK OFFICE
CERTIFICATE OF CORRECTION

| | | |
|---|---|---|
| PATENT NO. | : 11,595,299 B2 | |
| APPLICATION NO. | : 16/942425 | |
| DATED | : February 28, 2023 | |
| INVENTOR(S) | : Devta et al. | |

It is certified that error appears in the above-identified patent and that said Letters Patent is hereby corrected as shown below:

On the Title Page

Item [54], Column 1, under Title, Line 1, delete "method of" and insert -- method for --, therefor.

In the Specification

In Column 1, Line 1, delete "method of" and insert -- method for --, therefor.

In Column 1, Line 67, delete "flow" and insert -- flow. --, therefor.

In Column 2, Line 1, delete "DRAWINCIS" and insert -- DRAWINGS: --, therefor.

In Column 8, Line 45, delete "suppressed" and insert -- suppressed. --, therefor.

Signed and Sealed this
Twenty-third Day of January, 2024

Katherine Kelly Vidal
*Director of the United States Patent and Trademark Office*